United States Patent
McColgan et al.

(10) Patent No.: US 10,642,713 B1
(45) Date of Patent: May 5, 2020

(54) OBJECT-BASED MONITORING AND REMEDIATION SYSTEM

(71) Applicant: Juniper Networks, Inc., Sunnyvale, CA (US)

(72) Inventors: Edward McColgan, Leominster, MA (US); Omar Shihadeh Ansari, Fremont, CA (US); Kenji Morishige, Austin, TX (US); Justin D. Hayes, Lafayette, CO (US); Prakritish Sen Eshore, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 344 days.

(21) Appl. No.: 15/392,332

(22) Filed: Dec. 28, 2016

(51) Int. Cl.
  *G06F 11/30* (2006.01)
  *G06F 11/34* (2006.01)
  *G06F 11/32* (2006.01)

(52) U.S. Cl.
  CPC ........ *G06F 11/3495* (2013.01); *G06F 11/302* (2013.01); *G06F 11/3051* (2013.01); *G06F 11/3055* (2013.01); *G06F 11/328* (2013.01); *G06F 11/3072* (2013.01)

(58) Field of Classification Search
  CPC .... G06F 11/3495; G06F 11/30; G06F 11/302; G06F 11/3051; G06F 11/3055; G06F 11/3072
  See application file for complete search history.

(56) References Cited

U.S. PATENT DOCUMENTS

2015/0172152 A1* 6/2015 Aggarwal ........... G06F 11/0769
  709/204
2016/0359715 A1* 12/2016 Joglekar ................ H04L 43/12

OTHER PUBLICATIONS

Wikipedia's Table (information) historical version published Nov. 28, 2016 https://en.wikipedia.org/w/index.php?title=Table_(information)&oldid=751940114 (Year: 2016).*
M/Monit, "Version 5.20.0," https://mmonit.com/monit/documentation/monit.html, Jul. 25, 2012, 5 pages.

* cited by examiner

*Primary Examiner* — Joseph O Schell
(74) *Attorney, Agent, or Firm* — Harrity & Harrity, LLP (57) ABSTRACT

A device may receive object information identifying a plurality of objects, respective entities associated with the plurality of objects, and relationships between objects of the plurality of objects. The device may receive monitor information identifying a plurality of monitors associated with the plurality of objects. Each monitor may be associated with a respective condition to monitor a corresponding one or more of the plurality of objects. The device may receive a notification regarding a particular object, of the plurality of objects, based on a condition associated with the particular object being satisfied. The device may determine whether the condition will affect one or more other objects, of the plurality of objects, associated with respective entities. The device may provide notifications to the appropriate entities.

20 Claims, 8 Drawing Sheets

OBJECT-BASED MONITORING AND REMEDIATION SYSTEM

BACKGROUND

An entity or organization may implement a set of applications and/or devices. In some cases, one or more of the applications and/or devices may encounter a fault condition, such as a runtime error, a lack of available resources, a failure, or the like. Some fault conditions may cause errors in other devices or applications, and entities associated with the other devices or applications may benefit from knowledge of fault conditions associated with related devices.

SUMMARY

A non-transitory computer-readable medium may store one or more instructions that, when executed by one or more processors, cause the one or more processors to receive object information identifying a plurality of objects and respective entities associated with the plurality of objects. The object information may identify relationships between objects of the plurality of objects. The one or more instructions, when executed by the one or more processors, may cause the one or more processors to receive monitor information identifying a plurality of monitors associated with the plurality of objects. Each of the plurality of monitors may be associated with a respective condition based on which to monitor a corresponding one or more of the plurality of objects. The one or more instructions, when executed by the one or more processors, may cause the one or more processors to receive a notification regarding a particular object, of the plurality of objects, based on a condition associated with the particular object being satisfied. The condition may be identified by a particular monitor, of the plurality of monitors, associated with the particular object. The one or more instructions, when executed by the one or more processors, may cause the one or more processors to determine, based on the particular monitor, whether the condition will affect one or more other objects of the plurality of objects. The one or more other objects may be associated with respective relationships, of the relationships, to the particular object. The one or more instructions, when executed by the one or more processors, may cause the one or more processors to selectively provide the notification to only a particular entity, of the respective entities, associated with the particular object, or to one or more entities, of the respective entities, associated with the one or more other objects associated with relationships to the particular object, based on whether the condition will affect the one or more other objects. The notification may be provided to only the particular entity when the particular monitor does not indicate that the condition will affect the one or more other objects. The notification may be provided to the one or more entities when the particular monitor indicates that the condition will affect the one or more other objects.

A device may include one or more processors to receive object information identifying a plurality of objects and respective entities associated with the plurality of objects. The object information may identify relationships between objects of the plurality of objects, and the plurality of objects may include one or more of devices, applications, software elements, or hardware components. The device may receive monitor information identifying a plurality of monitors to monitor operation of the plurality of objects. Each of the plurality of monitors may be associated with a respective condition based on which to generate a corresponding notification regarding one or more corresponding objects of the plurality of objects. The device may cause, based on the monitor information, the plurality of monitors to be implemented with regard to the plurality of objects. The device may receive a notification regarding a particular object of the plurality of objects based on a condition, of the respective conditions, associated with the particular object being satisfied. The condition may be identified by a particular monitor, of the plurality of monitors, associated with the particular object. The device may identify one or more entities, of the respective entities, to receive the notification based on the particular object and/or the relationships between the objects. The device may provide the notification to the one or more entities.

A method may include receiving, by a monitoring platform, object information identifying a plurality of objects and respective entities associated with the plurality of objects. The object information may identify relationships between objects of the plurality of objects. The method may include receiving, by the monitoring platform, monitor information identifying a plurality of monitors to perform monitoring of the plurality of objects. Each of the plurality of monitors may be associated with a respective condition based on which to generate, by the monitoring platform, a notification regarding one or more corresponding objects of the plurality of objects. The method may include causing, by the monitoring platform, the plurality of monitors to be implemented. The method may include receiving, by the monitoring platform, a notification regarding a particular object, of the plurality of objects, based on a condition associated with the particular object being satisfied. The condition may be identified by a particular monitor, of the plurality of monitors, associated with the particular object. The method may include identifying, by the monitoring platform, a plurality of entities, of the respective entities, to receive the notification based on the particular object and/or the relationships between the objects. The plurality of entities may include at least one entity other than an entity associated with the particular object. The method may include providing, by the monitoring platform, the notification to the plurality of entities.

DETAILED DESCRIPTION

The following detailed description of example implementations refers to the accompanying drawings. The same reference numbers in different drawings may identify the same or similar elements.

A system, such as a system for application deployment, a set of servers, an information technology environment, or any other set of one or more devices and/or applications, may include one or more resources that host applications or elements of applications. As described herein, a resource may include a monitored device, such as a physical or virtual server on which software is hosted. Resources, applications (e.g., applications executing on one or more resources), software elements (e.g., a part of an application or an element independent of an application, such as a script), and hardware components (e.g., components of devices, such as processors, input component, output components, communication components, memories, etc.) may be collectively referred to herein as objects. In some implementations, the objects may be grouped into one or more deployments. A deployment may include a combination of an element or application and a resource (e.g., a device) on which the element or application will run. Each object may be associated with one or more entities (e.g., administrators, information technology experts, technicians, etc.) that are to receive information regarding operation of corresponding objects.

In some cases, an object may encounter a fault, such as a runtime error, a lack of available resources, a power outage, or any other condition that may impact operation of the object or another object (e.g., an object that has a relationship with the object). Some types of faults may affect other objects of the system. For example, failure of a particular application may cause failures of other applications that receive information from or provide information to the particular application. As another example, a failure of a device may cause failure or fault of applications that are implemented on the device. Faults that may affect other objects are referred to herein as critical faults.

Other types of faults may not affect other objects. In some cases, such a fault may be relevant or interesting to an entity associated with the faulting object, and not to entities associated with other objects. For example, the entity associated with the faulting object may want to know when a quantity of available resources of the object satisfies a threshold, even if the quantity of resources would not cause a fault or error for any other object. These types of faults are referred to herein as warning faults.

A device or process, such as a monitoring program or framework, may monitor the objects of the system to determine when faults occur. However, it may be difficult to distinguish when a fault is a critical fault or a warning fault. Furthermore, when monitoring a complex system, different entities may be interested in different faults for different objects, and it may be difficult to properly handle notifications regarding faults. For example, it may be difficult to determine whether a fault is a critical fault or a warning fault, and then to determine which entities should receive notifications regarding the fault. Still further, adding a new monitor to the system in order to monitor one or more devices and/or applications may be difficult when it is unclear which objects depend on the one or more devices and/or applications. Further, some applications may be implemented on multiple devices, and it may take significant amounts of time and effort to configure monitors on each of the multiple devices.

Implementations described herein provide a monitoring platform for deployments of resources, applications, and/or components. Implementations described herein may receive object information that identifies objects and dependencies or relationships between objects, and may use the object information to monitor faults of the objects. As used herein, a dependency refers to a hierarchical relationship between two or more objects indicating that failure of one of the two or more objects will affect another of the two or more objects. The object information may further identify entities associated with each object, and implementations described herein may provide fault notifications to entities based on the dependencies or respective relationships between the objects.

Implementations described herein may also receive monitor information that identifies monitors to be implemented with regard to objects. Implementations described herein may automatically implement the monitors in association with the objects. When a monitor is associated with a component or application that executes on multiple devices, implementations described herein may automatically implement the monitor on each of the multiple devices. This may be useful when a particular application is hosted on a variety of server devices, or when a particular type of monitored device is implemented in multiple, different locations. In this way, implementations described herein may conserve processor and time resources that would otherwise be used to manually implement multiple, different monitors.

Implementations described herein may determine whether a notification is associated with a warning fault or a critical fault, and may route the notification to the appropriate entities accordingly. For example, warning notifications may be routed to only an entity associated with the faulting object, and critical notifications may be routed to all entities associated with objects that depend on the faulting object. Implementations described herein may provide a user interface, such as a graphical user interface, to manage and/or provide this information. Implementations described herein may cause remedial actions to automatically be performed based on faulting objects.

In this way, detection and notification of faults of a monitored system is improved, thus reducing downtime. Also, implementations described herein conserve user resources and hours that would be used to define monitors on multiple, different objects. Further, implementations described herein improves routing of notifications for systems that include multiple, different objects that are associated with different entities, and selectively provides notifications for warnings to only an entity associated with the faulting object, thus conserving network and computational resources that would be used to provide the warning notification to unrelated entities. Implementations described herein selectively provide notifications for critical faults to entities associated with objects associated with the faulting object, which conserves network and computational resources that would be used to provide the critical fault notification to unrelated entities, and which enables the entities associated with the objects associated with the faulting object to take remedial action or predict outages of the objects associated with the faulting object.

Figure 1A:
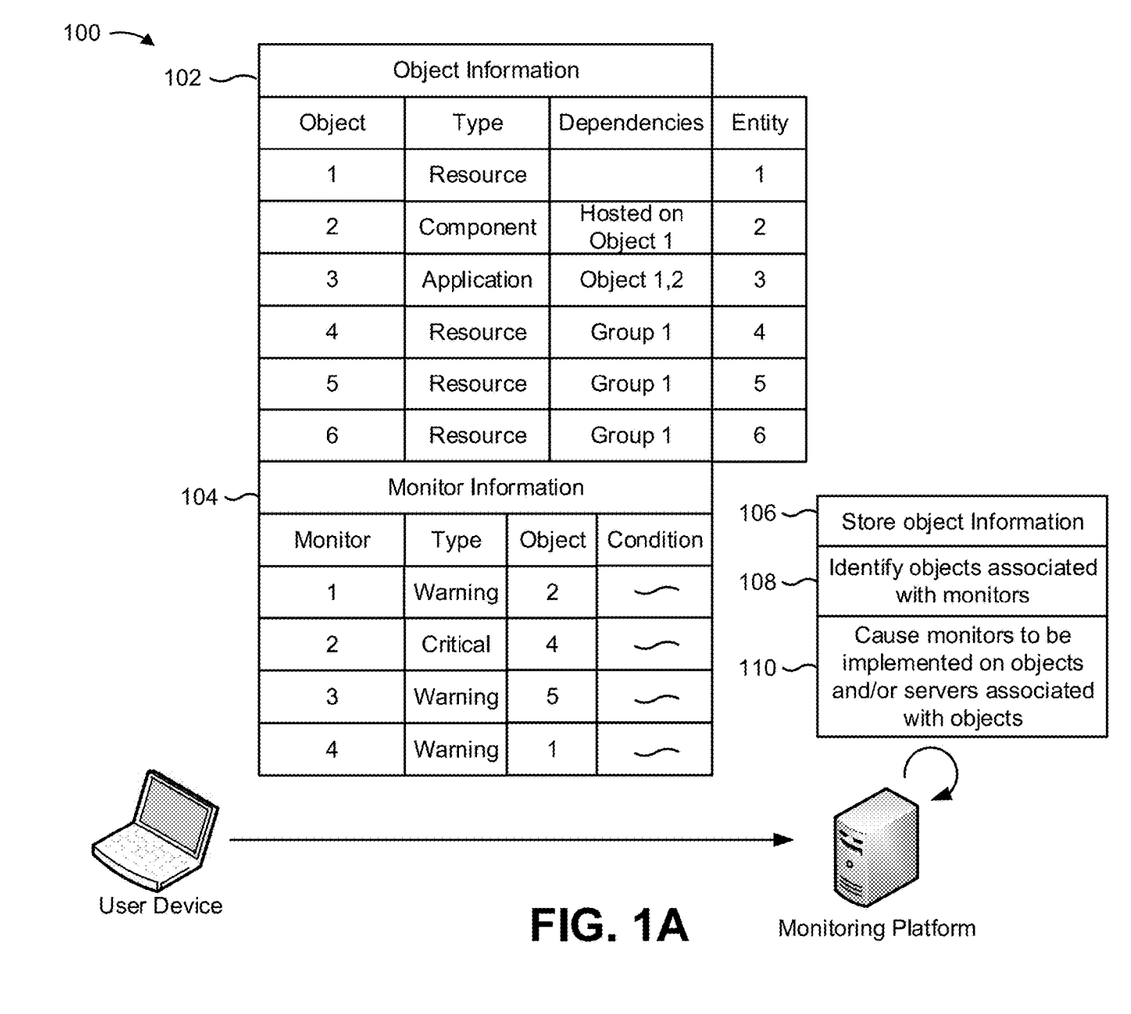
FIGS. 1A-1D are diagrams of an overview of an example implementation described herein.
Figure 1B:
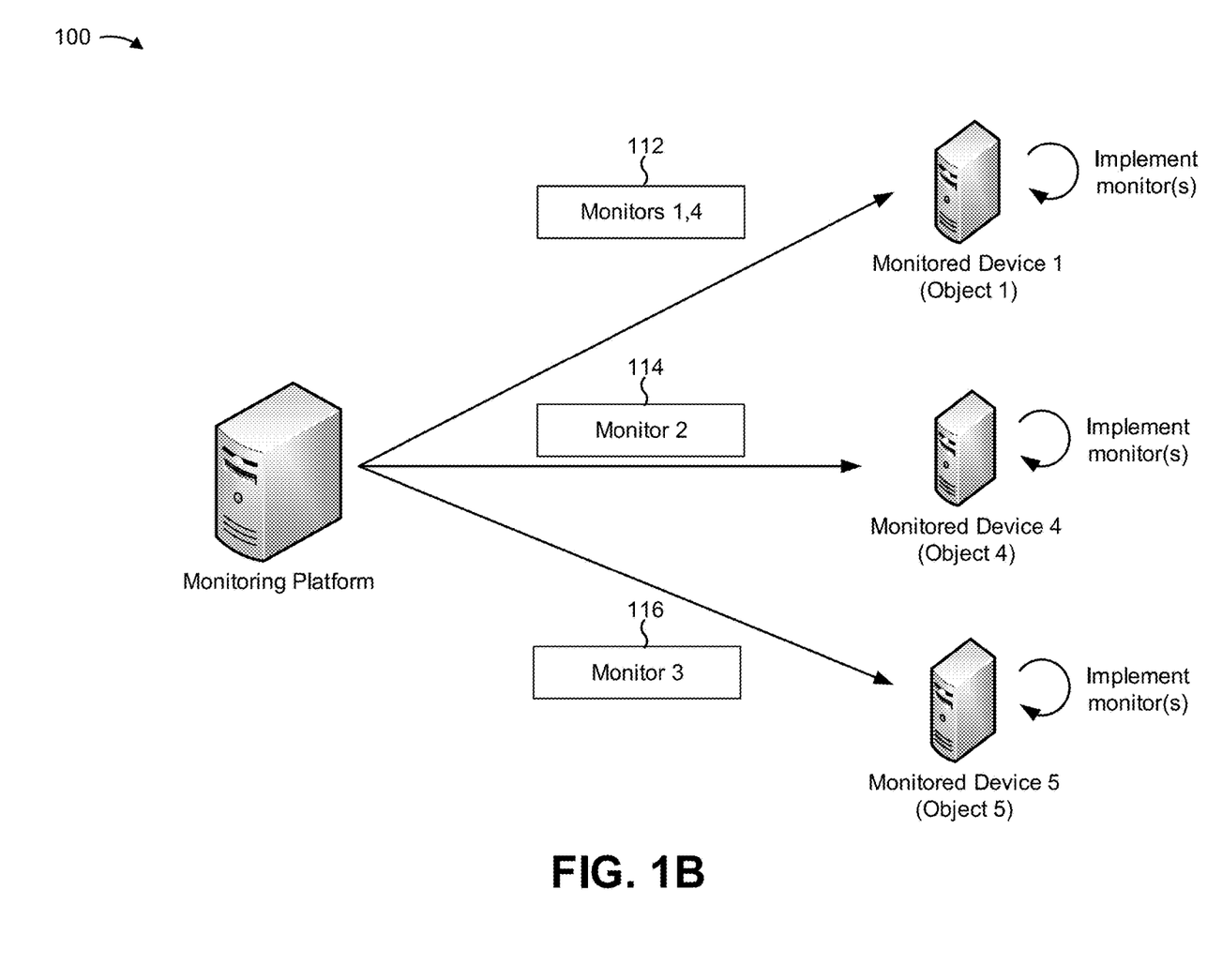

FIGS. 1A and 1B are diagrams of an overview of an example implementation 100 described herein.

As shown in FIG. 1A, the monitoring platform may receive object information associated with one or more objects. As shown by reference number 102, the object information may include information identifying one or more objects (e.g., objects 1 through 6). As further shown, the object information may identify object types of each object, which may identify each object as a resource or monitored device, a component, an application, or the like.

As further shown by reference number 102, the object information may identify one or more dependencies between objects. A dependency may indicate that a critical fault of a first object may affect a second object. For example, when the monitoring platform identifies a critical fault of the first object, the monitoring platform may provide a notification regarding the critical fault of the first object to an entity associated with the second object. As further shown, objects 4, 5, and 6 are associated with a group (e.g., Group 1). As described herein, a group includes a tagging mechanism to identify objects associated with a common purpose, to identify objects associated with a common application, or the like. For example, objects 4, 5, and 6 may all implement the same application, may be part of a parallel process, or the like. Thus, objects 4, 5, and 6 may be tagged as part of a group so that entities associated with objects 4, 5, and 6 receive notifications when one or more of objects 4, 5, or 6 experiences a critical fault.

As further shown by reference number 102, the object information may identify respective entities corresponding to each object. An entity may include a person, device, application, component, element, or organization that is to receive a notification regarding a fault associated with a corresponding object. For example, a particular entity associated with a particular object may receive notifications regarding warnings or critical faults associated with the particular object, as well as notifications regarding critical faults of objects on which the particular object depends (e.g., based on the dependencies identified above). In some implementations, the object information may identify a user device, network address, phone number, email address, or the like, associated with each entity.

As an example, and as further shown by reference number 102, object 1 may be a resource (e.g., a server device or virtual machine), may have no dependencies to any other object, and may be associated with entity 1. Object 2 may be a component, may be hosted on object 1, and may be associated with entity 2. Object 3 may be an application, may depend on objects 1 and 2, and may be associated with entity 3. Object 4 may be a resource, may depend on Group 1, and may be associated with entity 4. Object 5 may be a resource, may depend on group 1, and may be associated with entity 5. Object 6 may be a resource, may depend on group 1, and may be associated with entity 6. Here, objects 4, 5, and 6 are associated with dependencies to Group 1. For example, object 4, 5, and 6 may be included in Group 1, or may all depend on one or more objects of Group 1.

As further shown in FIG. 1A, the monitoring platform may receive monitor information, that identifies monitors, from the user device. A monitor may be a process or object that is configured to provide a notification when a condition, associated with one or more objects, is satisfied. For example, the monitor may monitor parameters associated with an object to determine when the condition is satisfied, and may generate or provide the notification when the condition is satisfied. A condition may relate to data transmission, memory utilization, an element malfunction (e.g., a user interface error, a processor element malfunction, etc.), an incorrectly formatted input, or the like.

As shown by reference number 104, the monitor information may include information identifying one or more monitors (e.g., monitor 1 through monitor 4). As further shown, the monitor information may identify monitor types of the one or more monitors. Here, monitors 1, 3, and 4 are warning monitors, indicating that notifications generated by monitors 1, 3, and 4 are to be provided to respective entities associated objects monitored by monitors 1, 3, and 4. Further, monitor 2 is a critical monitor, indicating that notifications generated by monitor 2 are to be provided to entities associated with each object that depends on an object monitored by monitor 2.

As further shown, the monitor information may identify one or more objects associated with (e.g., monitored by) the monitor and one or more conditions based on which each monitor is to generate a notification. Here, the conditions are not shown. For example, and as further shown by reference number 104, monitor 1 may include a warning monitor that is to monitor object 2. Monitor 2 may include a critical monitor that is to monitor object 4. Monitor 3 may include a warning monitor that is to monitor object 5. Monitor 4 may include a warning monitor that is to monitor object 1.

As further shown in FIG. 1A, and by reference number 106, the monitoring platform may store (e.g., in a list, a table, or another type of data structure) the object information received from the user device. As shown by reference number 108, the monitoring platform may identify objects (e.g., objects 1 through 6) to be monitored by the monitors 1 through 4. As shown by reference number 110, the monitoring platform may cause the monitors to be implemented on objects and/or on servers associated with the objects.

As shown in FIG. 1B, and by reference number 112, the monitoring platform may cause monitored device 1 (e.g., object 1) to implement monitors 1 and 4. For example, monitor 1 is associated with object 2 (e.g., a component object), and object 2 is hosted by monitored device 1, so the monitoring platform causes object 1 to implement monitor 1. Further, monitor 4 is associated with object 1, so the monitoring platform causes object 1 to implement monitor 4. As shown by reference number 114, the monitoring platform may cause monitored device 4 to implement monitor 2 based on monitor 2 being configured to monitor monitored device 4. As shown by reference number 116, the monitoring platform may cause monitored device 5 to implement monitor 3 based on monitor 3 being configured to monitor monitored device 5.

Figure 1C:
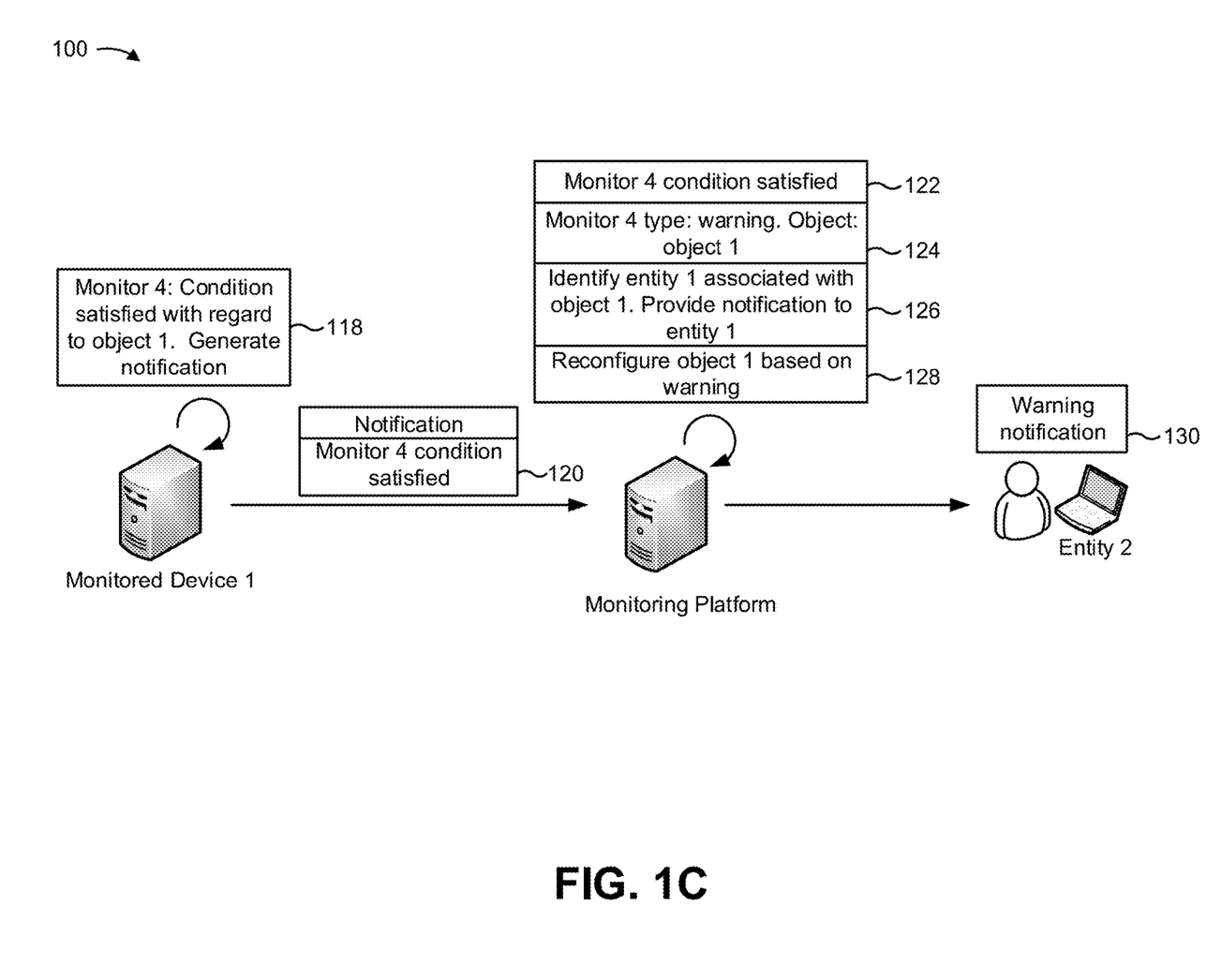

As shown in FIG. 1C, and by reference number 118, monitor 4 may determine that a parameter associated with object 1 has satisfied the condition associated with monitor 4. As shown by reference number 120, monitor 4 and/or monitored device 1 may generate and provide, to the monitoring platform, a notification indicating that the condition associated with monitor 4 has been satisfied. As shown by reference number 122, the monitoring platform may receive the notification indicating that the condition associated with monitor 1 is satisfied. As shown by reference number 124, the monitoring platform may determine that the notification is associated with a warning monitor and that the notification is associated with object 1.

As shown by reference number 126, the monitoring platform may determine that entity 1 is associated with object 1 (e.g., based on the object information shown in FIG. 1A). As further shown, the monitoring platform may determine to provide, to entity 1, the notification indicating that the condition associated with monitor 4 is satisfied. For example, the monitoring platform may identify a user device, network address, or the like associated with entity 1, and may provide the notification accordingly. As shown by reference number 128, the monitoring platform may reconfigure object 1 based on the warning. For example, monitor 4 may be associated with information identifying one or more remedial or preventative actions to perform when the condition associated with monitor 4 is satisfied. The monitoring platform, or another device (e.g., monitored device 1), may cause the one or more remedial or preventative actions to be performed (e.g., by monitored device 1 or another device).

As shown by reference number 130, entity 2 (e.g., a user device associated with entity 2) may receive, from the monitoring platform, the notification indicating that the condition associated with monitor 4 has been satisfied. For example, the notification may identify monitor 4, may identify the condition that has been satisfied, and/or may include other information. In some implementations, the notification may be provided via a user interface (e.g., a graphical user interface). For example, the user interface may provide information identifying an object, notifications regarding the object, a status of the object, other objects that depend on the object, other objects on which the object depends, or the like.

Figure 1D:
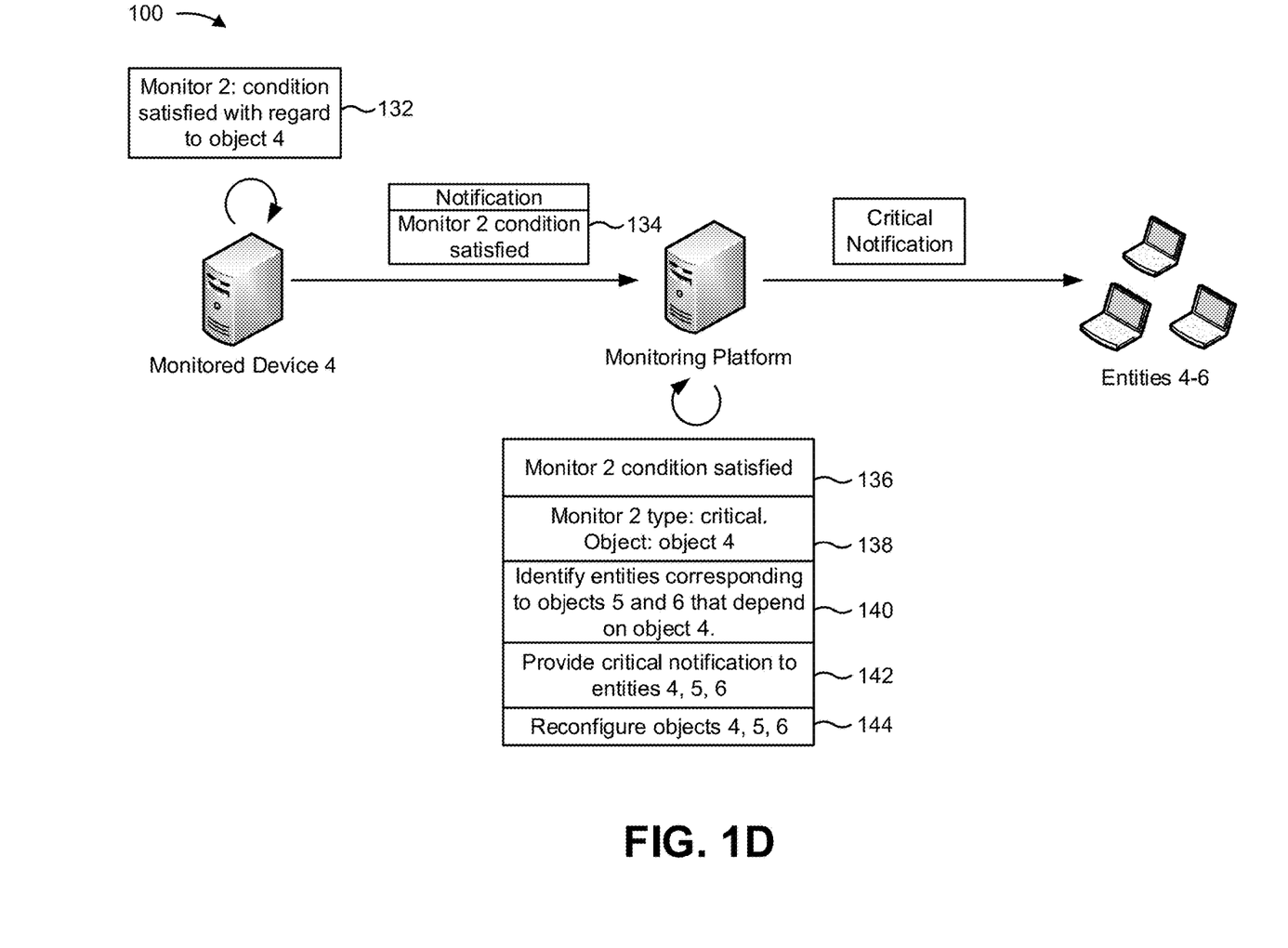

As shown in FIG. 1D, and by reference number 132, monitor 2 may determine that a condition associated with monitor 2 has been satisfied with regard to monitored device 4 (e.g., object 4). As shown by reference number 134, monitor 2 and/or monitored device 4 may provide, to the monitoring platform, a notification indicating that the condition associated with monitor 2 is satisfied. As shown by reference number 136, the monitoring platform may determine that the condition has been satisfied based on the notification.

As shown by reference number 138, the monitoring platform may determine that monitor 2 is a critical monitor. As shown by reference number 140, based on monitor 2 being a critical monitor, the monitoring platform may identify entities associated with objects that depend on monitored device 4 (e.g., object 4). For example, the monitoring platform may use the object information shown in FIG. 1A to identify the entities associated with monitored device 4. Here, the monitoring platform identifies objects 5 and 6 as depending on object 4 based on the object information (e.g., based on objects 4, 5, and 6 being included in Group 1).

As shown by reference number 142, the monitoring platform may provide the critical notification to entities 4 through 6. In some implementations, the monitoring platform may provide the critical notification to user devices associated with entities 4 through 6 (e.g., for display to entities 4 through 6). Additionally, or alternatively, the monitoring platform may provide the critical notification via a user interface, such as a graphical user interface, as described in more detail elsewhere herein. As shown by reference number 144, in some implementations, the monitoring platform may cause one or more objects to be reconfigured based on the critical notification. Here, the monitoring platform causes objects 4, 5, and 6 to be reconfigured (e.g., based on remedial or preventative actions that may be defined with regard to monitor 2).

In this way, the monitoring platform improves detection and notification of faults of the system, thus reducing downtime. Also, the monitoring platform conserves user resources and hours that would be used to define monitors on multiple, different objects. Additionally, the monitoring platform improves routing of notifications for systems that include multiple, different objects that are associated with different entities. Further, by selectively providing notifications for warnings to only an entity associated with a faulting object, the monitoring platform conserves network and computational resources that otherwise would be used to provide warning notifications to unrelated entities.

As indicated above, FIGS. 1A-1D are provided merely as an example. Other examples are possible and may differ from what was described with regard to FIGS. 1A-1D.

Figure 2:
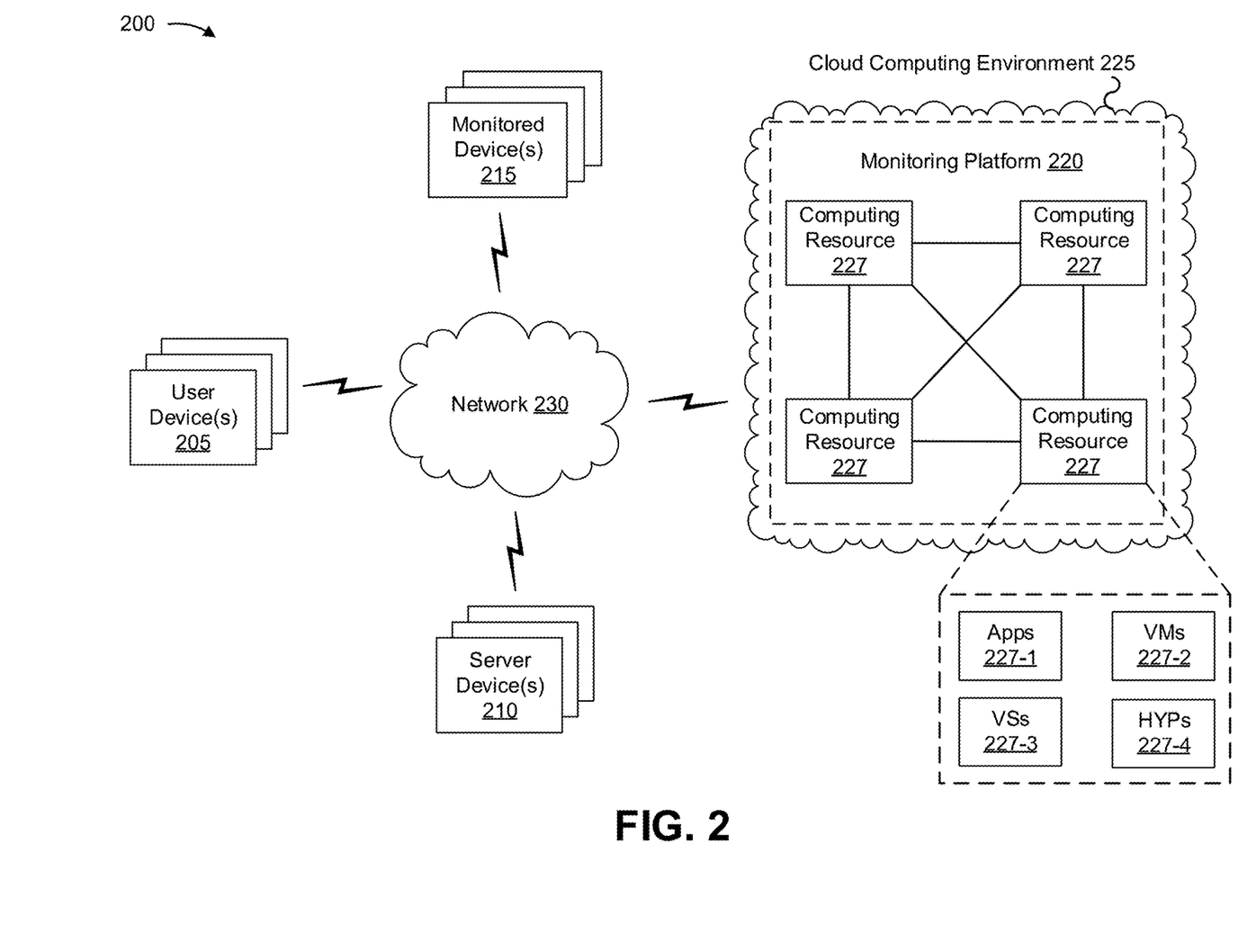
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, a user device 205, a server device 210, a monitored device 215, a monitoring platform 220 hosted within a cloud computing environment 225, and a network 230. Devices of environment 200 may interconnect via wired connections, wireless connections, or a combination of wired and wireless connections.

User device 205 includes one or more devices capable of receiving, generating, storing, processing, and/or providing information associated with notifications regarding monitored devices 215. For example, user device 205 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Server device 210 includes one or more devices capable of storing, processing, and/or routing information associated with performing monitoring of monitored devices 215. In some implementations, server device 210 may include a communication interface that allows server device 210 to receive information from and/or transmit information to other devices in environment 200.

Monitored device 215 includes one or more devices to be monitored by monitoring platform 220. For example, monitored device 215 may include a server device, a network device, a user device (e.g., as defined in connection with user device 205, above), or the like. In some implementations, monitored device 215 may host one or more monitors, and may provide information based on conditions associated with the one or more monitors. In some implementations, environment 200 includes a group of monitored devices 215 associated with a cloud computing environment or a data center.

Monitoring platform 220 includes one or more devices capable of receiving, storing, processing, and/or providing information associated with monitoring a system of one or more objects. For example, monitoring platform 220 may include a server or a group of servers. In some implementations, monitoring platform 220 may cause monitors to be implemented with regard to objects (e.g., monitored devices 215, components of monitored devices 215, and/or software or software elements running on monitored devices 215). In some implementations, monitoring platform 220 may store object information identifying relationships or dependencies between objects, and may identify entities to receive notifications regarding objects based on the object information. In some implementations, monitoring platform 220 may provide a user interface (e.g., a graphical user interface) via which to provide information regarding objects and/or notifications associated with objects. In some implementations, monitoring platform 220 may implement a remote monitor. In some implementations, monitoring platform 220 may be implemented as part of cloud computing environment 225.

Cloud computing environment 225 includes an environment that delivers computing as a service, whereby shared resources, services, etc. may be provided to monitoring platform 220. Cloud computing environment 225 may provide computation, software, data access, storage, and/or other services that do not require end-user knowledge of a physical location and configuration of a system and/or a device that delivers the services. As shown, cloud computing environment 225 may include monitoring platform 220 and computing resource 227.

Computing resource 227 includes one or more personal computers, workstation computers, server devices, or another type of computation and/or communication device. In some implementations, computing resource 227 may host monitored device 215. The cloud resources may include compute instances executing in computing resource 227, storage devices provided in computing resource 227, data transfer devices provided by computing resource 227, etc. In some implementations, computing resource 227 may communicate with other computing resources 227 via wired connections, wireless connections, or a combination of wired and wireless connections.

As further shown in FIG. 2, computing resource 227 may include a group of cloud resources, such as one or more applications ("APPs") 227-1, one or more virtual machines ("VMs") 227-2, virtualized storage ("VSs") 227-3, one or more hypervisors ("HYPs") 227-4, or the like.

Application 227-1 includes one or more software applications that may be provided to or accessed by user device 205. Application 227-1 may eliminate a need to install and execute the software applications on user device 205. For example, application 227-1 may include software associated monitored device 215 and/or any other software capable of being provided via cloud computing environment 225. In some implementations, one application 227-1 may send/receive information to/from one or more other applications 227-1, via virtual machine 227-2.

Virtual machine 227-2 includes a software implementation of a machine (e.g., a computer) that executes programs like a physical machine. Virtual machine 227-2 may be either a system virtual machine or a process virtual machine, depending upon use and degree of correspondence to any real machine by virtual machine 227-2. A system virtual machine may provide a complete system platform that supports execution of a complete operating system ("OS"). A process virtual machine may execute a single program, and may support a single process. In some implementations, virtual machine 227-2 may execute on behalf of a user (e.g., user device 205), and may manage infrastructure of cloud computing environment 225, such as data management, synchronization, or long-duration data transfers.

Virtualized storage 227-3 includes one or more storage systems and/or one or more devices that use virtualization techniques within the storage systems or devices of computing resource 227. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 227-4 provides hardware virtualization techniques that allow multiple operating systems (e.g., "guest operating systems") to execute concurrently on a host computer, such as computing resource 227. Hypervisor 227-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
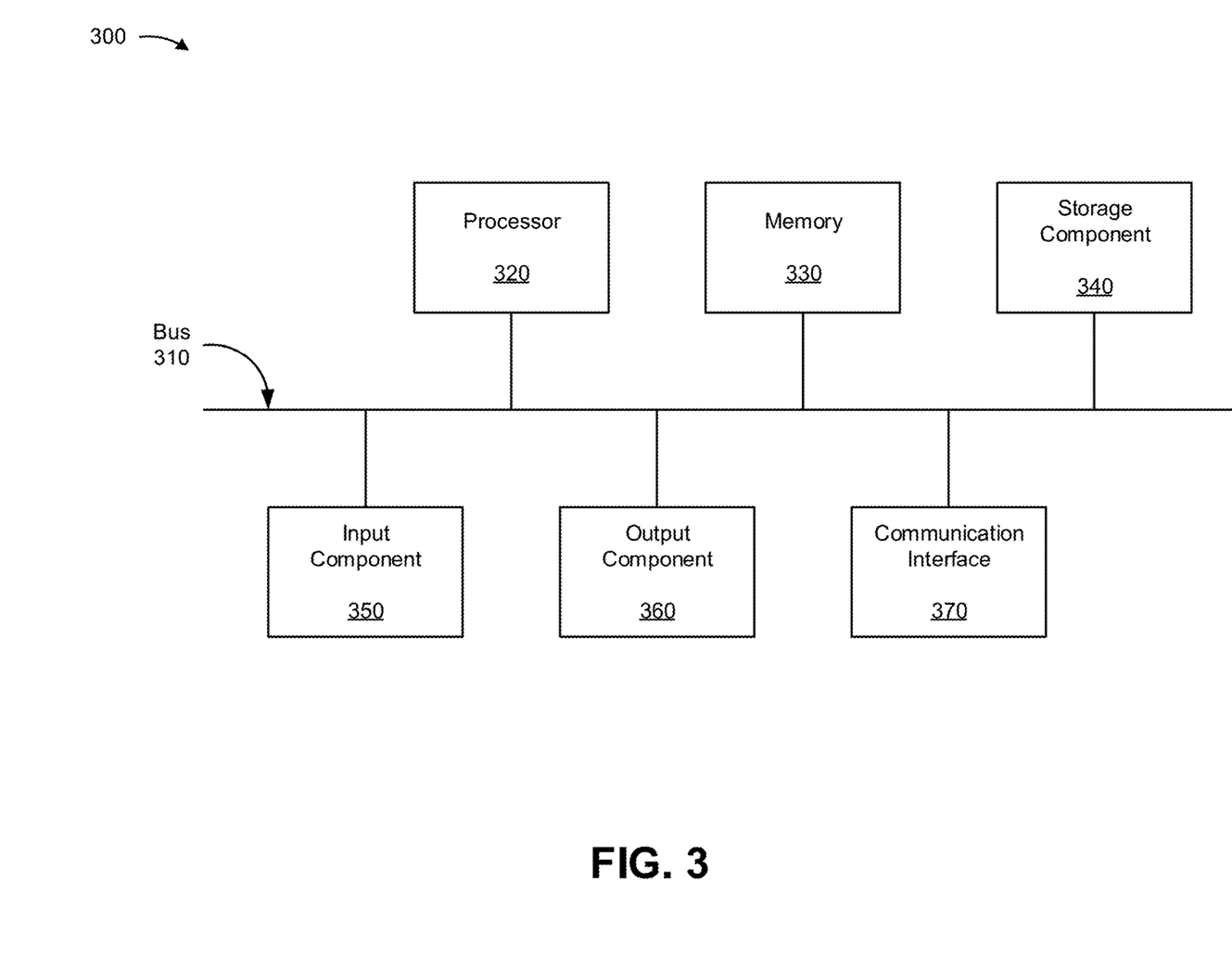
FIG. 3 is a diagram of example components of one or more devices of FIG. 2.

FIG. 3 is a diagram of example components of a device 300. Device 300 may correspond to user device 205, server device 210, patient platform 215, and cloud computing environment 220. In some implementations, user device 205, server device 210, patient platform 215, and/or cloud computing environment 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
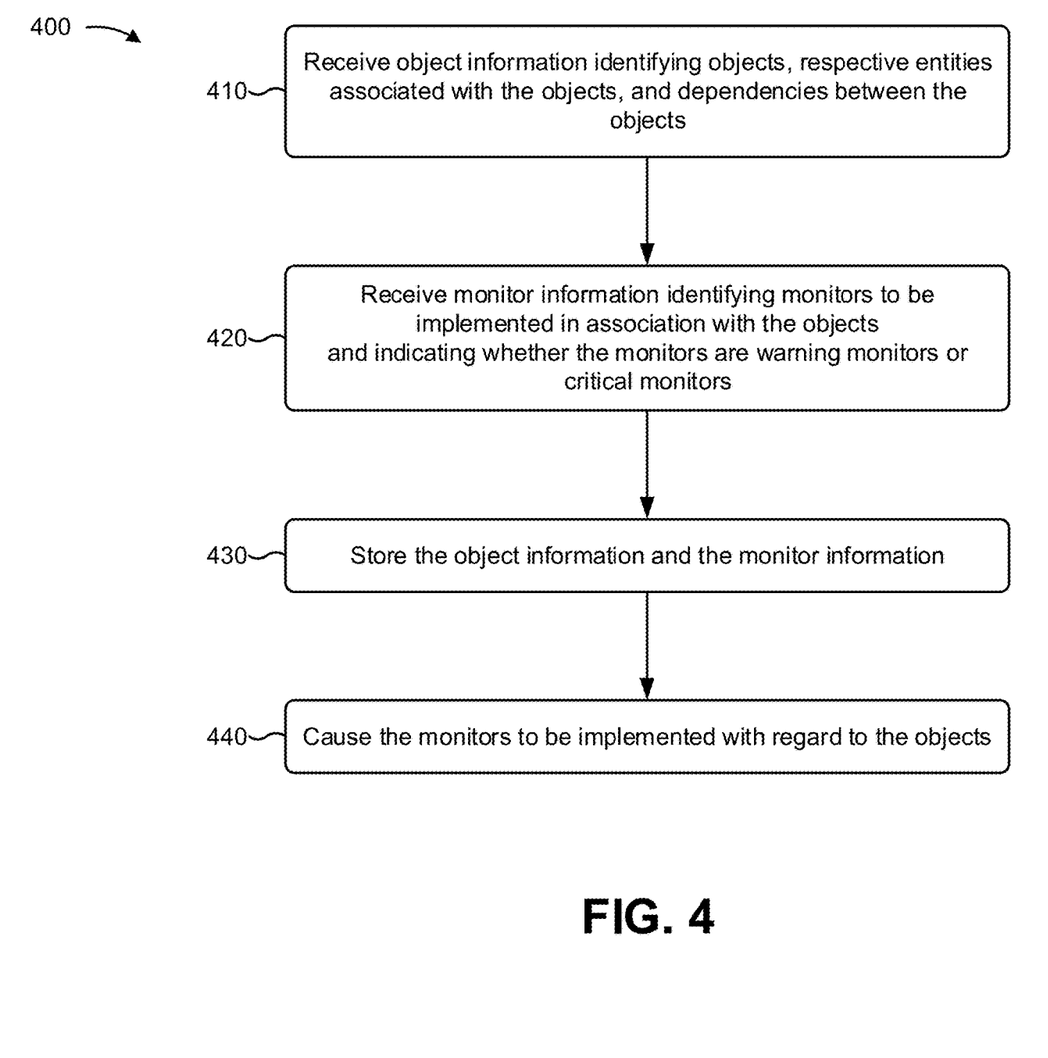
FIG. 4 is a flow chart of an example process for hierarchical monitoring and remediation for software elements and servers.

FIG. 4 is a flow chart of an example process 400 for hierarchical monitoring and remediation of objects by a monitoring platform. In some implementations, one or more process blocks of FIG. 4 may be performed by monitoring platform 220. In some implementations, one or more process blocks of FIG. 4 may be performed by another device or a group of devices separate from or including monitoring platform 220, such as user device 205, server device 210, and monitored device 215.

As shown in FIG. 4, process 400 may include receiving object information identifying objects, respective entities associated with the objects, and dependencies between the objects (block 410). For example, monitoring platform 220 may receive object information identifying objects, respective entities associated with the objects, and dependencies between the objects. In some implementations, monitoring platform 220 may receive the object information from user device 205 associated with an administrator. Additionally, or alternatively, monitoring platform 220 may receive object information from monitored devices 215 (e.g., based on monitored devices 215 providing information identifying applications, software elements, hardware components, or the like on monitored devices 215).

In some implementations, the object information may identify objects (e.g., monitored devices 215, resources, components, applications, or the like). For example, the object information may identify a device identifier, a network address, an application identifier, a software element identifier, a component identifier, and/or another information identifying an object or an attribute of an object. In some cases, the object information may identify an application or software element, and may identify each monitored device 215 on which the application or software element is hosted or run. In some cases, the object information may identify a hardware component, and may identify each monitored device 215 on which the hardware component is implemented. In this way, monitoring platform 220 permits distribution of monitors to monitored devices 215 without manually replicating the monitors, thus saving time and processor resources.

In some implementations, the object information may identify one or more deployments. A deployment may include a combination of an application, a software element, a hardware component, or the like, and a resource (e.g., a monitored device 215). In some implementations, the object information may identify one or more tools. A tool, as described herein, may include an application, a software element, a hardware component, or the like (e.g., a web service, a portal, or the like).

In some implementations, the object information may identify an entity associated with an object. For example, the object information may identify a user device 205, a network address, an email address, a telephone number, or the like, associated with an entity. In some implementations, object information may identify a single entity per object, multiple entities for a single object, a single entity for multiple objects, or the like. In other words, there can be a one-to-one, a one-to-many, a many-to-one, or the like relationship between objects and entities.

In some implementations, the object information may identify dependencies between objects. In some implementations, a dependency between a first object and a second object may indicate that a critical fault of the first object may affect the second object. For example, a critical fault of the first object may impact performance, may cause a critical fault, or the like, of the second object. The object information may identify dependencies between particular objects. For example, a failure of monitored device 215 that runs an application could cause a failure of the application. As another example, a failure of server device 210 may cause a failure of a remote monitor that is implemented on server device 210 to monitor monitored device 215. In some implementations, a dependency may be associated with a direction. For example, when an application is dependent on monitored device 215, and monitored device 215 is not dependent on the application, a dependency associated with the application may indicate that the application is dependent on monitored device 215 and not vice versa.

In some implementations, the object information may identify a new object to be added to an implemented system or to be monitored. In such a case, monitoring platform 220 may identify dependencies associated with the new object. In some implementations, monitoring platform 220 may automatically identify dependencies associated with the new object. For example, if the new object runs on a particular monitored device 215, monitoring platform 220 may automatically identify the new object as dependent on the particular monitored device 215. In some implementations, monitoring platform 220 may identify dependencies associated with the new object based on information identifying the dependencies. For example, the object information identifying the new object may identify dependencies associated with the new object.

As further shown in FIG. 4, process 400 may include receiving monitor information identifying monitors to be implemented in association with the objects and indicating whether the monitors are warning monitors or critical monitors (block 420). For example, monitoring platform 220 may receive monitor information identifying monitors to be implemented in association with the objects and indicate whether the monitors are warning monitors or critical monitors. In some implementations, the monitor information may be based on a monitoring framework or programming language, such as Monit, Application Performance Monitoring (APM), or the like.

In some implementations, the monitor information may identify one or more conditions to monitor with regard to an object. A condition may identify a state of an object, and a monitor may generate a notification when a current state of the object matches the state associated with the condition. For example, a condition may relate to a resource availability condition, a value of a variable, whether a device is powered on, a throughput of a device, a latency of a device, a battery power level of a device, a temperature of a hardware component of a device, a state of an application or a software element of a device, or any other similar state.

In some implementations, a monitor may include a warning monitor or a critical monitor. A warning monitor may relate to a state of an object that indicates a potential impending issue, whereas a critical monitor may relate to a state of an object that may impact the performance or function of another object. As an example of a warning monitor, a warning monitor may cause a notification to be provided to an entity associated with the object when the object experiences a condition and the condition will not affect objects that depend on the object. As an example of a critical monitor, a critical monitor may cause a notification to be provided to the entity associated with the object, and to one or more other entities associated with one or more objects that depend on the object, when the object experiences a condition that may impact performance of the one or more objects that depend on the object. In some implementations, the monitor information may include information identifying each monitor as a warning monitor or a critical monitor.

In some implementations, the monitor information may identify a remediation action. In some implementations, a remediation action may identify an action to perform when a condition associated with the monitor is satisfied. For example, when a monitor indicates that monitoring platform 220 is to provide a warning notification at 85 percent memory utilization of monitored device 215, a remediation instruction may indicate that monitoring platform 220 is to automatically purge memory of monitored device 215. In this way, remediation instructions may enable automatic resolution or remediation of faults, thus improving system performance and reducing downtime and/or faulty system performance.

As further shown in FIG. 4, process 400 may include storing the object information and the monitor information (block 430). For example, monitoring platform 220 may store the object information and the monitor information. In some implementations, monitoring platform 220 may store information identifying the dependencies. For example, monitoring platform may store information identifying a hierarchy of objects based on the dependencies. In some implementations, monitoring platform 220 may store information identifying monitors associated with each object, an entity associated with each object, or the like. Storing the object information may permit monitoring platform 220 to identify entities associated with objects, to route notifications to the appropriate entities, and/or to implement or update monitors with regard to the objects.

In some implementations, monitoring platform 220 may store information identifying objects in local memory. In this way, monitoring platform 220 provides quicker access to information identifying objects and conserves network resources. In some implementations, monitoring platform 220 may store information identifying objects in memory located remotely. In this way, monitoring platform 220 conserves local storage space.

As further shown in FIG. 4, process 400 may include causing the monitors to be implemented in association with the objects (block 440). For example, monitoring platform 220 may cause the monitors to be implemented in association with the objects. In some implementations, monitoring platform 220 may cause a monitor to be implemented locally on monitored device 215. For example, monitored device 215 may host an agent of a monitoring framework, and monitoring platform 220 may provide the monitor to be implemented by the agent. In this way, monitoring platform 220 may conserve network resources as compared to remote implementation, and may enable types of monitoring that cannot be performed by remote monitors.

Additionally, or alternatively, monitoring platform 220 may cause a monitor to be implemented remotely from monitored device 215. For example, server device 210 or monitoring platform 220 may host agents of a monitoring platform in order to remotely monitor objects. In this way, monitoring platform 220 conserves processor resources of monitored device 215 and enables monitoring of objects that are incapable of locally hosting a monitor.

In some implementations, monitoring platform 220 may use an information technology (IT) administration tool to cause the monitors to be implemented. The IT administration tool may identify each monitored device 215 or server device 210 that is to receive a monitor. For example, the administration tool may establish a secure session with monitored device 215 or server device 210 that is to implement the monitor, and may provide information identifying the monitor via the secure session. Additionally, or alternatively, the administration tool may configure a remote device (e.g., server device 210) to implement a remote monitor. In this way, monitoring platform 220 improves security of the system. In some implementations, monitoring platform 220 may use Ansible, Chef, Puppet, or a similar IT administration tool.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
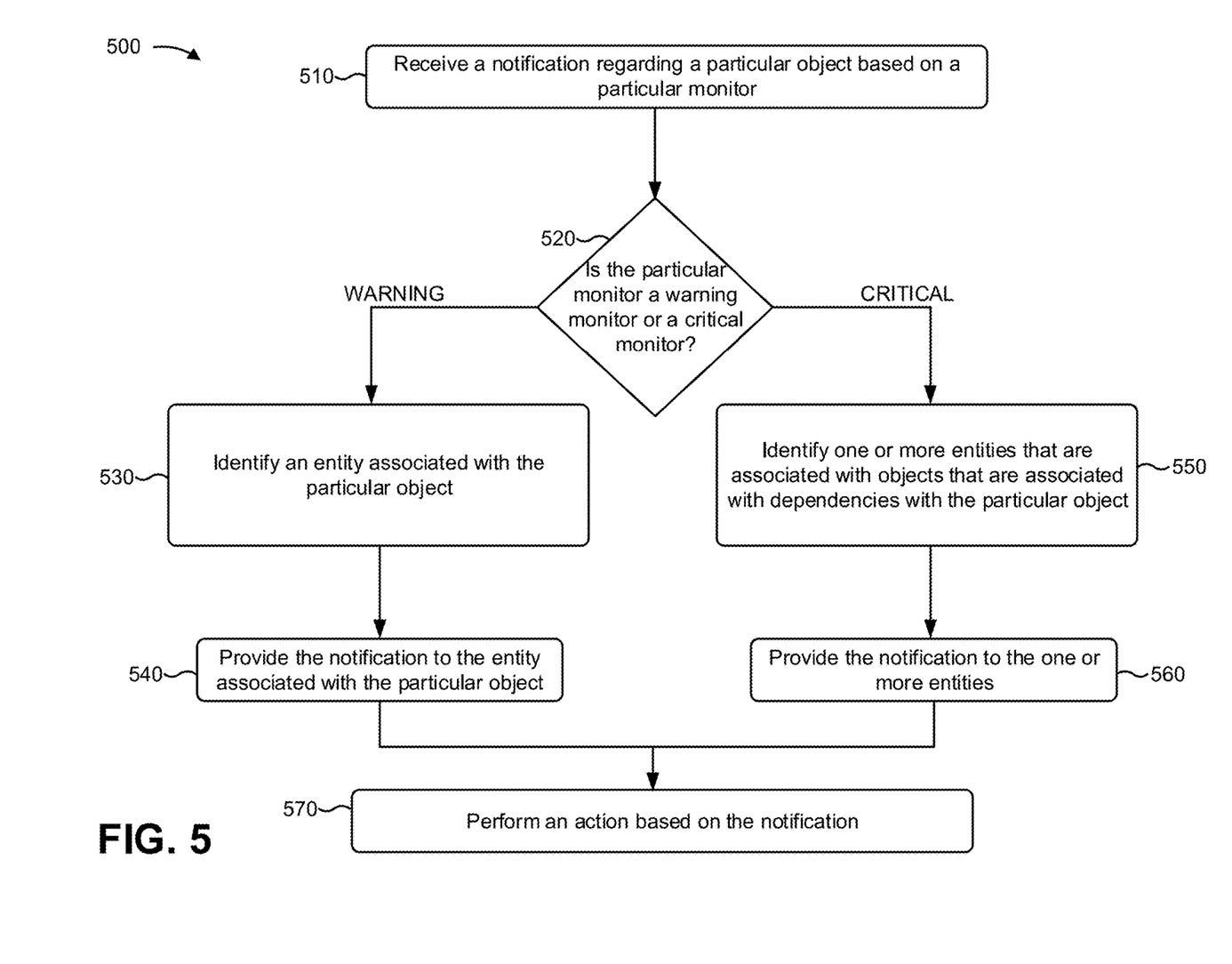
FIG. 5 is a flow chart of an example process for hierarchical monitoring and remediation for software elements and servers.

FIG. 5 is a flow chart of an example process 500 for hierarchical monitoring and remediation of objects by a monitoring platform. In some implementations, one or more process blocks of FIG. 5 may be performed by monitoring platform 220. In some implementations, one or more process blocks of FIG. 5 may be performed by another device or a group of devices separate from or including monitoring platform 220, such as user device 205, server device 210, and monitored device 215.

As shown in FIG. 5, process 500 may include receiving a notification regarding a particular object based on a particular monitor (block 510). For example, monitoring platform 220 may receive a notification regarding a particular object based on a particular monitor. The notification may be associated with the particular object. For example, a particular monitor may generate the notification based on a condition associated with the particular monitor being satisfied by the particular object. In some implementations, monitoring platform 220 may receive the notification from monitored device 215 (e.g., when monitored device 215 implements the monitor) or server device 210 (e.g., when server device 210 implements a remote monitor for one or more objects).

As further shown in FIG. 5, process 500 may include determining whether the particular monitor is a warning monitor or a critical monitor (block 520). For example, monitoring platform 220 may determine whether the particular monitor is a warning monitor or a critical monitor. That is, monitoring platform 220 may determine whether a fault corresponding to the notification is a warning fault or a critical fault. In some implementations, monitoring platform 220 may determine whether a fault corresponding to the notification is a warning fault or a critical fault based on information included in the notification indicating whether the notification relates to a warning monitor or a critical monitor. Additionally, or alternatively, monitoring platform 220 may determine whether a fault corresponding to the notification is a warning fault or a critical fault based on stored information indicating whether the particular monitor is a warning monitor or a critical monitor, and based on information in the notification identifying the particular monitor. Additionally, or alternatively, monitoring platform 220 may determine whether a fault is a warning fault or a critical fault based on information in the notification identifying the particular object, and based on determining whether the particular object has any other object depending on the particular object.

As further shown in FIG. 5, when the particular monitor is a warning monitor (block 520—WARNING), then process 500 may include identifying an entity associated with the particular object (block 530). For example, when the particular monitor is a warning monitor, monitoring platform 220 may identify an entity associated with the particular object. In some implementations, monitoring platform 220 may identify an entity associated with the particular object based on stored object information identifying objects and corresponding entities, as described in more detail in connection with FIG. 4, above. In some implementations, monitoring platform 220 may identify a user device 205 associated with the entity (e.g., based on a network address, device identifier, telephone number, email address, etc.).

As further shown in FIG. 5, process 500 may include providing the notification to the entity associated with the particular object (block 540). For example, monitoring platform 220 may provide the notification to the entity associated with the particular object. In some implementations, monitoring platform 220 may provide the notification to user device 205 that is associated with the entity. By providing the notification to the entity associated with the particular object, monitoring platform 220 conserves resources of monitoring platform 220 and/or other entities that would otherwise be used to provide the notification to one or more other entities.

In some implementations, monitoring platform 220 may provide the notification for display via a user interface of user device 205 (e.g., user device 205 associated with the entity corresponding to the particular object). In some implementations, the user interface may identify objects and notifications associated with the objects. In some implementations, the user interface may indicate whether an object is associated with one or more warning and/or fault conditions or notifications.

In some implementations, the user interface may identify dependencies between objects. For example, the user interface may identify a set of objects that depend on an object associated with a warning notification, or may identify a set of objects that are associated with a particular group. In some implementations, the user interface may identify a resource (e.g., monitored device 215) on which the object associated with the warning notification is hosted or run.

In some implementations, the user interface may identify other deployments of the object associated with the warning notification. For example, when the object associated with the warning notification is deployed on multiple resources, the user interface may identify other deployments of the object with regard to other resources. In this way, monitoring platform 220 enables preventative action to be taken with regard to the other deployments, thus improving application performance and reducing downtime and critical fault occurrence.

As further shown in FIG. 5, when the particular monitor is a critical monitor (block 520—CRITICAL), then process 500 may include identifying one or more entities that are associated with objects that are associated with dependencies with the particular object (block 550). For example, when the particular monitor is a critical monitor, monitoring platform 220 may identify one or more entities that are associated with objects that are associated with dependencies of the particular object. In some implementations, monitoring platform 220 may use object information associated with the particular object to identify the dependencies for the particular object. Based on the identified dependencies, monitoring platform 220 may identify objects associated with the dependencies for the particular object. In some implementations, monitoring platform 220 may identify one or more entities (e.g., user devices 205 associated with the one or more entities to receive the notification) based on the object information.

In some implementations, monitoring platform 220 may determine that the notification relates to a critical monitor based on information included in the notification. For example, the notification may indicate that notification is associated with a critical monitor. Additionally, or alternatively, monitoring platform 220 may determine that the notification relates to a critical monitor based on stored information. For example, the notification may include information identifying the monitor, and monitoring platform 220 may refer to stored monitor information to determine that the monitor is a critical monitor. Additionally, or alternatively, monitoring platform 220 may determine whether a fault is a warning fault or a critical fault based on information in the notification identifying the particular object, and based on determining whether the particular object has any other object depending on the particular object.

In some implementations, monitoring platform 220 may identify multiple, different entities associated with multiple different objects. For example, when multiple objects are associated with dependencies to the particular object, monitoring platform 220 may identify entities associated with the multiple objects (e.g., based on object information associated with the multiple objects). Additionally, or alternatively, monitoring platform 220 may identify each object in a dependency chain with the faulting object, and may provide notifications to entities associated with each object. For example, assume that a first monitored device 215 faults, that a second monitored device 215 depends on the first monitored device 215, and that a third monitored device 215 depends on the second monitored device 215. In that case, monitoring platform 220 may provide notifications to the second monitored device 215 and the third monitored device 215. In this way, monitoring platform 220 allows notification of multiple entities when a fault of a particular object may impact the multiple entities, even when the multiple entities are not associated with the same resource, deployment, or the like.

As further shown in FIG. 5, process 500 may include providing the notification to the one or more entities (block 560). For example, monitoring platform 220 may provide the notification to the one or more entities. In some implementations, monitoring platform 220 may provide the notification to one or more user devices 205 associated with the one or more entities. For example, monitoring platform 220 may identify the one or more user devices 205 based on the object information associated with the one or more entities.

In some implementations, monitoring platform 220 may provide different notifications to different entities. For example, a notification provided to an entity associated with a faulting object may identify a condition that triggered the notification, other objects that may be affected by the condition, or the like. Additionally, or alternatively, a notification provided to an entity associated with an object that depends on the faulting object may identify the faulting object, may identify a predicted outcome associated with the notification (e.g., failure of the object that depends on the faulting object, a decreased throughput of a system, etc.). In this way, different information may be provided to entities associated with different objects, which may reduce transmission of irrelevant data and improve diagnosis and correction of faults.

In some implementations, notifications may be provided via a user interface, such as a graphical user interface. For example, the graphical user interface may provide information identifying the notification, the faulting object associated with the notification, or the like. In some implementations, the graphical user interface may provide information identifying a relationship between an object associated with the entity and the faulting object. For example, the graphical user interface may provide a tree of dependencies for objects of a particular system or deployment, and may indicate operational information associated with the objects. In some implementations, the graphical user interface may identify operational information based on identifying objects as functional, as associated with a warning notification, or as associated with a fault notification (e.g., based on color coding, icons associated with the objects, etc.). In this way, monitoring platform 220 allows efficient identification of effects of critical fault conditions, and enables remediation or preventative action to be taken.

As further shown in FIG. 5, when the particular monitor is a critical monitor or a warning monitor, process 500 may include performing an action based on the notification (block 570). For example, when the particular monitor is a critical monitor or a warning monitor, monitoring platform 220 may perform an action, or may cause an action to be performed, based on the notification. In some implementations, an action may include a remediation or preventative action. For example, an action may include clearing a memory of monitored device 215 based on a warning notification relating to memory usage of monitored device 215, rerouting network traffic via a different monitored device 215 when a critical notification relating to a particular monitored device 215 is received, clearing a cache of monitored device 215, restarting an application or monitored device 215, or any similar action.

In some implementations, monitoring platform 220 may perform the action based on information associated with the particular monitor (e.g., the warning monitor or critical monitor that generated the notification). For example, monitor information may include information identifying the action to be performed based on the notification, and monitoring platform 220 may cause the action to be performed. As another example, the monitor may include information identifying the action to be performed, and a device that hosts the monitor (e.g., server device 210, monitored device 215, or the like) may cause the action to be performed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, monitoring platform 220 improves detection and notification of faults of a system that includes a group of objects, thus reducing downtime. Also, monitoring platform 220 conserves user resources and hours that would be used to define monitors on multiple, different objects. Additionally, monitoring platform 220 improves routing of notifications for systems that include multiple, different objects that are associated with different entities. Further, by selectively providing notifications for warnings to only an entity associated with the faulting object, monitoring platform 220 conserves network and computational resources that otherwise would be used to provide the warning notification to unrelated entities.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
one or more instructions that, when executed by one or more processors, cause the one or more processors to:
receive, and store in a table, object information identifying a plurality of objects and respective entities associated with the plurality of objects,
the object information being based on tagging that identifies relationships between objects of the plurality of objects;
receive monitor information identifying a plurality of monitors associated with the plurality of objects,
each of the plurality of monitors being associated with a respective condition based on which to monitor a corresponding one or more of the plurality of objects;
receive a notification regarding a particular object, of the plurality of objects, based on a condition associated with the particular object being satisfied,
the condition being identified by a particular monitor, of the plurality of monitors, associated with the particular object, and
the notification separately identifying both the particular monitor and the condition being satisfied;
determine, based on the particular monitor, whether the condition will affect one or more other objects of the plurality of objects,
the one or more other objects being associated with respective relationships, of the relationships, to the particular object; and
selectively provide the notification to only a particular entity, of the respective entities, associated with the particular object, or to one or more entities, of the respective entities, associated with the one or more other objects associated with relationships to the particular object, based on a criticality of the condition,
the notification being provided to only the particular entity when the particular monitor indicates that the criticality of the condition is of a first type, and
the notification being provided to the one or more entities when the particular monitor indicates that the criticality of the condition is of a second type.

2. The non-transitory computer-readable medium of claim 1, where the one or more instructions, when executed by the one or more processors, further cause the one or more processors to:
cause the plurality of monitors to be implemented with regard to the plurality of objects.

3. The non-transitory computer-readable medium of claim 2, where the one or more instructions, that cause the one or more processors to cause the plurality of monitors to be implemented with regard to the plurality of objects, cause the one or more processors to:
cause a single monitor, of the plurality of monitors, to be implemented with regard to multiple, different objects of the plurality of objects.

4. The non-transitory computer-readable medium of claim 1, where the particular monitor is implemented on a device other than a device associated with the particular object.

5. The non-transitory computer-readable medium of claim 1, where the one or more instructions, when executed by the one or more processors, further cause the one or more processors to:
identify an action to be performed with regard to the particular object; and
cause the action to be performed with regard to the particular object.

6. The non-transitory computer-readable medium of claim 1, where the one or more instructions, that cause the one or more processors to selectively provide the notification to only the particular entity, cause the one or more processors to:
provide the notification via a user interface,
the user interface identifying the particular object and the one or more other objects, and
the user interface providing information identifying states of the particular object and the one or more other objects.

7. The non-transitory computer-readable medium of claim 1, where the plurality of objects include at least two of:
one or more devices,
one or more applications executed on one or more devices,
one or more software elements executed on one or more devices, or
one or more hardware components implemented on one or more devices.

8. A monitoring platform, comprising:
one or more memories; and
one or more processors, to:
receive, and store in a table, object information identifying a plurality of objects and respective entities associated with the plurality of objects,
the object information being based on tagging that identifies relationships between objects of the plurality of objects, and
the plurality of objects including one or more of devices, applications, software elements, or hardware components;
receive monitor information identifying a plurality of monitors to monitor operation of the plurality of objects,
each of the plurality of monitors to be associated with a respective condition based on which to generate a corresponding notification regarding one or more corresponding objects of the plurality of objects;
cause, based on the monitor information, the plurality of monitors to be implemented with regard to the plurality of objects;
receive, from a monitor, a notification regarding a particular object of the plurality of objects based on a condition, of the respective conditions, associated with the particular object being satisfied,
the condition being identified by a particular monitor, of the plurality of monitors, associated with the particular object, and
the notification separately identifying both the particular monitor and the condition being satisfied;
identify one or more entities, of the respective entities, to receive the notification based on the particular monitor that identified the condition and a corresponding criticality of the condition; and
provide the notification to the one or more entities.

9. The monitoring platform of claim 8, where the one or more processors, when identifying the one or more entities to receive the notification, are to:
identify a particular entity, of the respective entities, associated with the particular object; and
where the one or more processors, when providing the notification, are to:
provide the notification to the particular entity.

10. The monitoring platform of claim 8, where the one or more processors are further to:
identify a set of objects of the plurality of objects,
each of the set of objects being associated with a respective relationship with the particular object; and
where the one or more processors, when identifying the one or more entities to receive the notification, are to:
identify a set of entities, corresponding to the set of objects, to receive the notification,
the notification to be provided to each of the set of entities.

11. The monitoring platform of claim 8, where a relationship between the particular object and another object indicates that operation of the other object will be affected based on the condition associated with the particular object being satisfied.

12. The monitoring platform of claim 8, where the one or more processors are further to:
cause an action to be performed with regard to the particular object based on the condition associated with the particular object being satisfied.

13. The monitoring platform of claim 12, where the action is identified by the particular monitor.

14. A method, comprising:
receiving, by a monitoring platform, and storing in a table, object information identifying a plurality of objects and respective entities associated with the plurality of objects,
the object information being based on tagging that identifies relationships between objects of the plurality of objects;
receiving, by the monitoring platform, monitor information identifying a plurality of monitors to perform monitoring of the plurality of objects,
each of the plurality of monitors being associated with a respective condition based on which to generate, by the monitoring platform, a notification regarding one or more corresponding objects of the plurality of objects;
causing, by the monitoring platform, the plurality of monitors to be implemented;
receiving, by the monitoring platform, a notification regarding a particular object, of the plurality of objects, based on a condition associated with the particular object being satisfied,
the condition being identified by a particular monitor, of the plurality of monitors, associated with the particular object, and
the notification separately identifying both the particular monitor and the condition being satisfied;
identifying, by the monitoring platform, a plurality of entities, of the respective entities, to receive the notification based on the particular object and a criticality of the condition,
the plurality of entities including at least one entity other than an entity associated with the particular object; and
providing, by the monitoring platform, the notification to the plurality of entities.

15. The method of claim 14, where the plurality of entities are associated with respective objects of the plurality of objects,
each of the respective objects being associated with a respective relationship to the particular object.

16. The method of claim 15, where a relationship between the particular object and another object indicates that operation of the other object will be affected based on the condition associated with the particular object being satisfied.

17. The method of claim 14, where the entity associated with the particular object is included in the plurality of entities.

18. The method of claim 14, where the particular monitor is implemented on a device other than a device associated with the particular object.

19. The method of claim 14, further comprising:
performing an action with regard to the particular object, the action being identified by the particular monitor.

20. The method of claim 14, where the notification is a first notification; and
where the method further comprises:
receiving a second notification;
determining, based on a given monitor that generated the second notification, that the second notification is to be provided to a single entity associated with a monitored object for which the notification was generated; and
providing the second notification to the single entity associated with the monitored object.

* * * * *